United States Patent Office 2,820,410
Patented Jan. 21, 1958

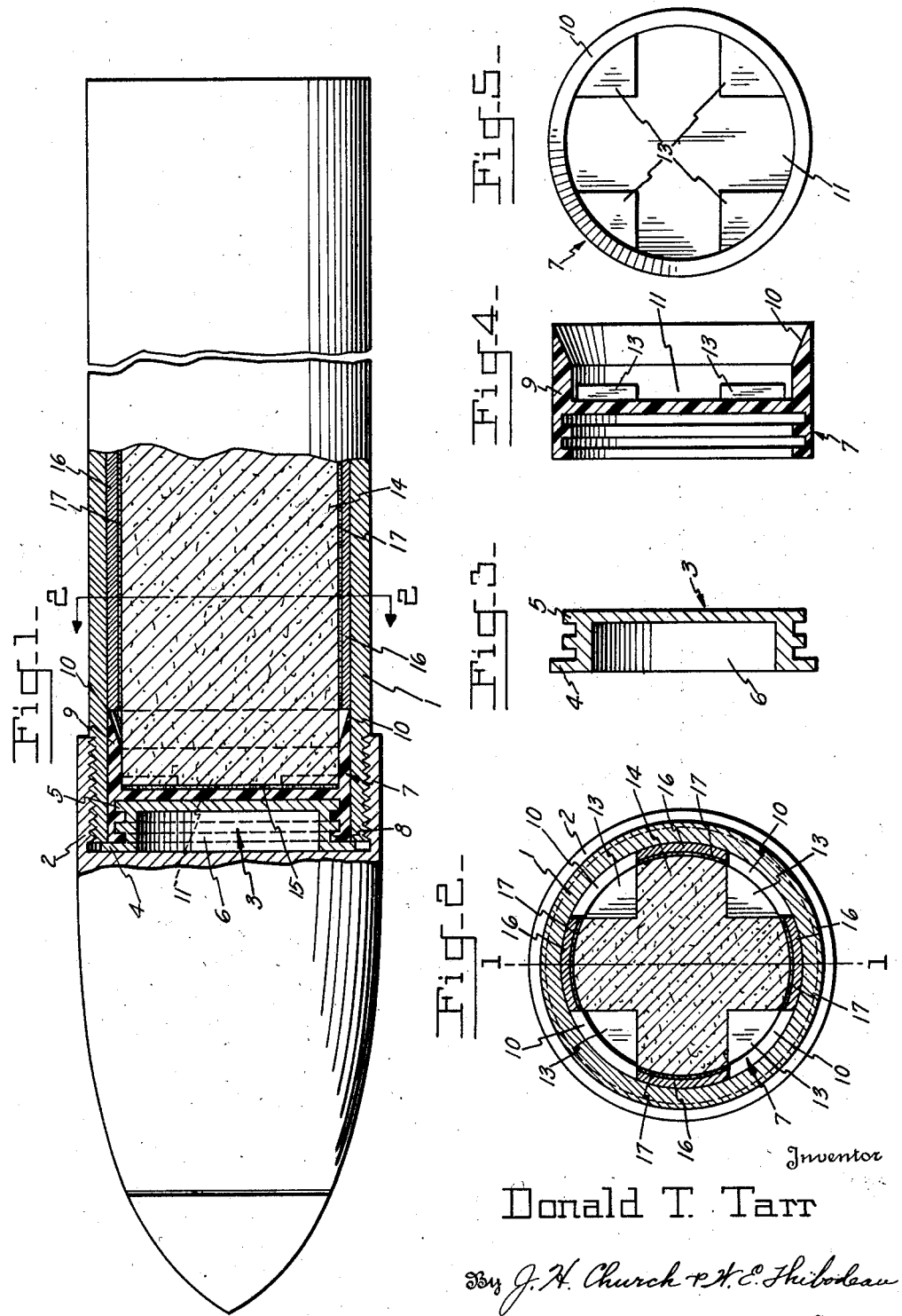

2,820,410

ROCKET PROPELLENT SUPPORT

Donald T. Tarr, Sierra Madre, Calif., assignor to the United States of America as represented by the Secretary of War Application April 4, 1946, Serial No. 659,574

5 Claims. (Cl. 102—49)

This invention relates to an improved propellent support for rocket projectiles and to a method for supporting propellent grains in rocket projectiles.

An object of this invention is to provide an improved propellent support for rocket projectiles which isolates the front face of the propellent grain from the pressure generated in a rocket motor.

Another object of this invention is to provide an improved propellent support for rocket projectiles which minimizes or eliminates the need of grids or other propellent supporting devices between the rear end of the propellent grain and the rocket nozzle thereby improving the flow of gases into the muzzle.

Still another object of this invention is to provide an improved method for supporting the propellent grains of a rocket projectile.

The specific nature of this invention as well as other objects and advantages thereof will clearly appear from a description of a preferred embodiment as shown in the accompanying drawings in which:

Fig. 1 is a side elevation, partly in longitudinal section, of a rocket projectile of the character described herein.

Fig. 2 is a cross sectional view taken along line 2—2 of Fig. 1.

Fig. 3 is a cross sectional view taken through the base member.

Fig. 4 is a cross sectional view taken through the seal.

Fig. 5 is a rear end view of the seal.

The improved rocket propellent support herein considered may be incorporated in any conventional rocket motor. Such rocket motor includes a motor tube 1 having either one or several nozzles, not shown, at its rear or discharge end. The forward end of the motor tube is screw threaded into a cap or adapter 2 which may be a part of a bomb head or armor-piercing head or other suitable projectile. The cap 2 closes the end of motor tube 1.

A base member 3 is mounted at the forward end of motor tube 1 and is provided with a flange 4 which is interposed between and clamped by the forward end of motor tube 1 and the cap or adapter 2. The base member 3 is a substantially shallow cup and is provided with a recess 6 at its forward side for weight reduction. Radially outwardly directed ribs 5 are provided around the periphery of base member 3.

Molded around base member 3 is an end sealing member 7 preferably formed of plastic material. The end sealing member 7 covers the base member 3 and fills the annular space between the ribs 5 and the walls of the motor tube 1, as indicated by 8. Such sealing member is provided with a rearwardly directed skirt 9 conforming to the walls of the motor tube and having a bevelled edge 10 at its extremity. The portion of the end sealing member 7 which covers base member 3 is provided with a propellent grain receiving recess 11 which is shaped to conform to the end of a propellent grain 14. In the construction illustrated, the grain 14 is of cruciform cross section. Such is only a preferred embodiment however as propellent grains 14 may be cylindrical or any other shape and a plurality of such grains may be supported within tube 1 in accordance with this invention, as will be presently described. The portions of end sealing member 7 not covered by the propellent grain are indicated by 13. A plasticizer or adhesive material 15 is used to bond the end of the grain to the end sealing member. It is preferred to use cellulose acetate for the sealing member and a plasticizer such as the ethylene glycol monoethyl ether known under the trade name of "Cellosolve."

The radial extremities of the propellent grain arms are provided with inhibitor strips 16 likewise secured by a plasticizer or adhesive 17. These strips terminate short of the skirt 9. The effect of the inhibitor strips on the propellent grain is to slightly retard the burning rate of powder grain 14 in order to better control the gas pressure with motor 1. The igniter, not shown, is placed between the arms of the propellent grain or between such grain and the nozzle, not shown.

The base member 3 is capable of withstanding the pressures generated within motor tube 1 during burning of the propellent grain. The flange 4 and skirt 9 serve to prevent gas leakage from motor tube 1. The bond between the front face of propellent grain 14 and end sealing member 7 removes such face from the effect of pressure within motor tube 1. The rear end face of grain 14, however, is subjected to the combustion pressure; consequently, there is an end thrust forwardly on the grain commensurate with the front face area thereof bonded to the sealing means.

During acceleration of the rocket there is a set back force on the propellent grain due to the inertia of the mass of the propellent grain. This force is in opposition to the unbalanced pressure due to combustion within the rocket motor. This latter force may be equal or greater than the set back force depending upon the area of the bond between the end sealing member 7 and propellent grain 14 so that the resulting force holds the grain away from the rear or nozzle end of the motor tube and thereby eliminates or minimizes the need of a grid or other supporting device between the rear end of propellent grain 14 and the nozzle.

I claim:

1. In a rocket motor, a tube screw-threaded into a head member, a cup shaped reinforcing base member having an integral flange adapted to be clamped between the forward end of said tube and said head member, a sealing member molded around said reinforcing base member and shaped to seal against the walls of said tube, a propellent grain adapted to fit within said motor tube and bonded to said sealing member.

2. In a rocket, a tube screw threaded into a detachable head member, a cup shaped reinforcing base member having an integral flange adapted to be clamped between the forward end of said tube and said head member, a sealing member molded around said base member and having a skirt shaped to seal against the interior wall of said tube under the influence of propellant gas pressure, a propellant received within said tube and bonded to said sealing member.

3. In a rocket having a detachable head member, a motor tube screw threaded onto said head member, a cup shaped base member having a radially extending flange, said flange clamped between the forward end of said tube and base of said head member, a generally cup shaped sealing member fixed to said base member and having a rearwardly extending skirt portion, said skirt sealingly engaging the interior surface of said tube under the influence of combustion gas pressure, a propellant received within said tube, and means to bond the front face of said propellent to the adjacent surface of said sealing member.

4. In a rocket having a detachable head member, a motor tube attached to said head member, means to seal said motor tube at the junction of said tube and head member, said seal comprising a metal cup shaped base member having a radially extending flange integral therewith, said flange being tightly clamped between said tube and head member, a sealing member integral with said base member and having a rearwardly extending skirt portion terminating in a bevelled edge, said skirt being expanded against the interior wall of said tube under the influence of propellent gases, a propellant within said tube, said propellant having the face adjacent said sealing member bonded thereto.

5. Sealing means for a rocket having a head member detachably secured to a motor tube comprising, a metal cup shaped base member, a radially extending flange integral with the open end of said base member, a plurality of ribs protruding from the exterior surface of said base member, a sealing member molded to said base member about said ribs, a skirt portion integral with said sealing member extending into said tube, said skirt terminating in a bevelled edge and adapted to expand against the interior wall of said tube under propellant gas pressure, a propellant grain of cruciform cross section received within said tube, said grain having the face adjacent said sealing member bonded thereto.

References Cited in the file of this patent

UNITED STATES PATENTS

| | | |
|---|---|---|
| 1,313,926 | Stokes | Aug. 26, 1919 |
| 2,043,268 | Skinner | June 9, 1936 |
| 2,400,242 | Malina et al. | May 14, 1946 |
| 2,412,173 | Pope | Dec. 3, 1946 |
| 2,494,562 | Kessenich | Jan. 17, 1950 |

FOREIGN PATENTS

| | | |
|---|---|---|
| 26,430 | Great Britain | Nov. 29, 1907 |
| 502,560 | France | Feb. 24, 1920 |